United States Patent [19]
Maida

[11] Patent Number: 5,155,730
[45] Date of Patent: Oct. 13, 1992

[54] RESET CIRCUIT FOR MICROCOMPUTER

[75] Inventor: Yoshiaki Maida, Osaka, Japan

[73] Assignee: Sanyo Electric Co., Ltd., Osaka, Japan

[21] Appl. No.: 466,976

[22] Filed: Jan. 18, 1990

[30] Foreign Application Priority Data

Jan. 19, 1989 [JP] Japan ................................. 1-10226

[51] Int. Cl.$^5$ .................. G06F 11/00; G06F 1/24; G11B 15/10
[52] U.S. Cl. .................. 371/12; 307/272.3; 358/335
[58] Field of Search .............. 307/272.3; 371/12, 66; 358/194.1, 335; 365/228

[56] References Cited

U.S. PATENT DOCUMENTS

| | | | |
|---|---|---|---|
| 3,854,123 | 12/1974 | Banach | 358/194.1 X |
| 4,227,259 | 10/1980 | Mogi | 358/194.1 X |
| 4,375,106 | 2/1983 | Yoll | 358/194.1 X |
| 4,405,982 | 9/1983 | Ruhnau et al. | 371/12 X |
| 4,523,295 | 6/1985 | Zato | 358/335 X |
| 4,611,271 | 9/1986 | Hattori et al. | 371/12 X |
| 4,612,499 | 9/1986 | Andresen et al. | 307/360 X |
| 4,788,661 | 11/1988 | Morita | 365/228 X |

OTHER PUBLICATIONS

Seshu, S., et al., "The Diagnosis of Asynchronous Sequential Switching Systems", *IRE Trans. on Electronic Computers*, Aug. 1962, pp. 459–465.

Agrawal, V. et al., "A Directed Search Method for Test Generation Using a Concurrent Simulator", *IEEE Trans. on CAD*, vol. 8, No. 2, Feb. 1989, pp. 131–137.

*Primary Examiner*—Stephen M. Baker
*Attorney, Agent, or Firm*—Heller, Ehrman, White & McAuliffe

[57] ABSTRACT

A video tape recorder includes a microcomputer, an input terminal and a decoder. Its mode of operation can be determined by selectably applying one of a set of different voltages at the input terminal thereby causing the decoder to transmit an appropriate signal to the microcomputer. If a preselected voltage such as the ground voltage is applied at the input terminal, the decoder outputs a reset signal to thereby reset the microcomputer without the need for a dedicated reset switch.

11 Claims, 1 Drawing Sheet

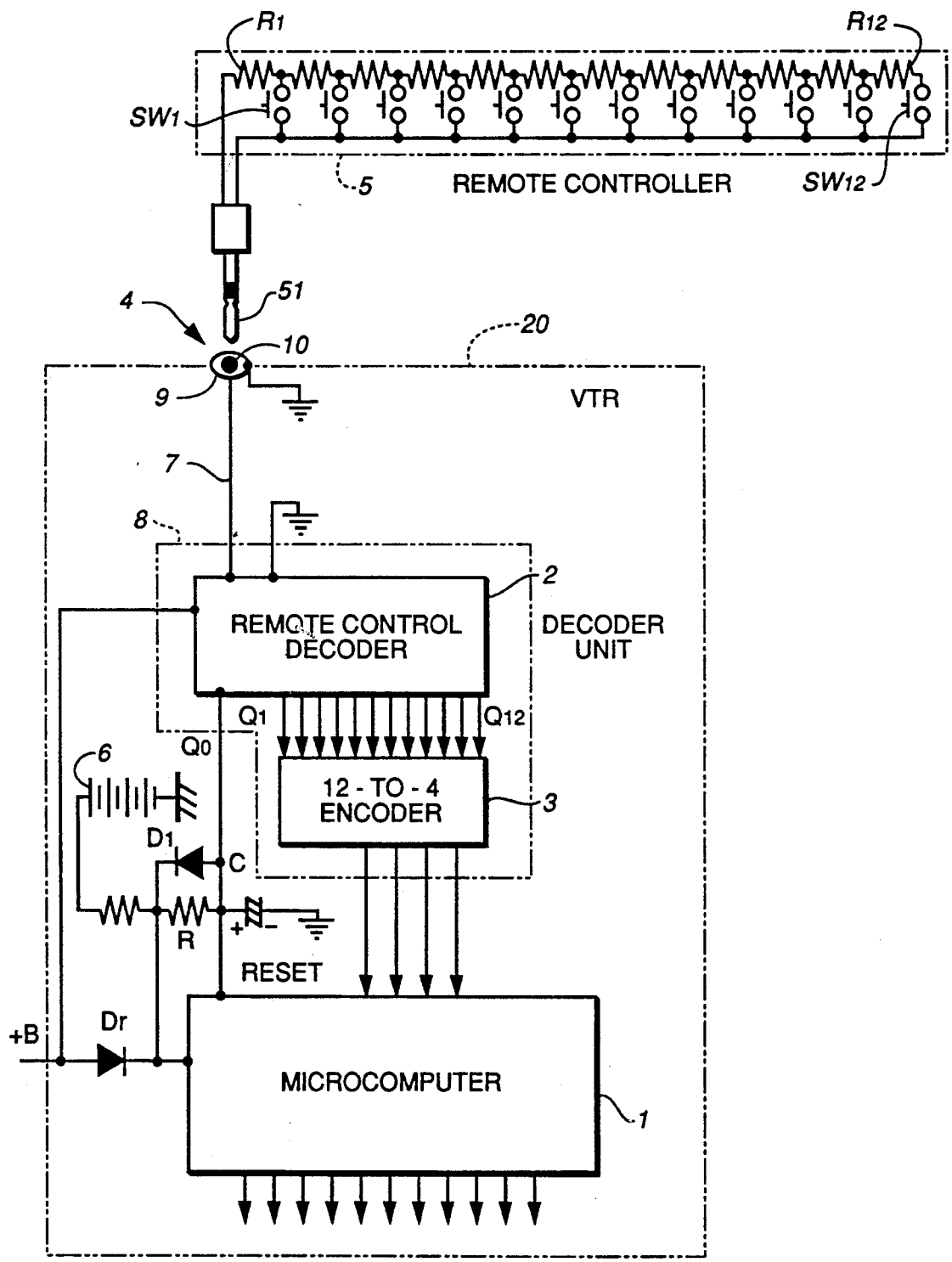

RESET CIRCUIT FOR MICROCOMPUTER

BACKGROUND OF THE INVENTION

This invention relates to a reset circuit for a microcomputer and more particularly to a video tape recorder having a reset circuit for its microcomputer.

There has been disclosed in Japanese Patent Publication Tokkai 60-198980 a time-lapse type video tape recorder which protects its memory device by means of a back-up power source such that the key-inputted data stored therein will not be erased by a power failure. Most video tape recorders, even if provided with a battery back-up mechanism, however, lose the stored data if the supply of power from an external source is stopped for a long time, say, for 30-60 minutes. On the other hand, video tape recorders of a so-called time-lapse type are used for monitoring, for example, and are frequently operated for a long period of time according to a stored program without any control from outside. For this reason, they are usually designed such that the stored data and programs are not lost even if the supply of power from its normal external source is discontinued for a relatively long time.

In many video tape recorders, the memory device for storing such data and programs for operation is usually provided in a microcomputer. In the event of a runaway, such a microcomputer can be reset by stopping the supply of power to it and this can be accomplished in less than an hour in the case of a video tape recorder of an ordinary type. In the case of a time-lapse video tape recorder, however, the supply of power may have to be discontinued for a much longer period, say, for about 100 hours. This is because a back-up power source for such a video tape recorder is usually capable of supplying a back-up voltage to the memory device for a longer time. For this reason, time-lapse video tape recorders are usually provided with a reset switch dedicated to the resetting of the microcomputer.

In addition to a reset switch, some time-lapse video tape recorders are also provided with a locking mechanism for "locking" a mode of operation so as to prevent, for example, an inadvertent interruption of recording caused by an operation error. Some locking mechanisms are so designed that they can be unlocked only by an authorized person. If the reset switch of a time-lapse video tape recorder is operated to reset its microcomputer, however, the mode of operation in which the apparatus has been locked becomes unlocked automatically. Since a reset switch is usually provided at an easily visible position and its method of operation can be easily learned even by an unauthorized person, the operation of a time-lapse video tape recorder in an intended mode may be frequently disrupted.

SUMMARY OF THE INVENTION

It is therefore an object of the present invention to provide a reset circuit for a microcomputer of an apparatus such as a video tape recorder requiring no dedicated reset switch to be operated for resetting the microcomputer.

It is another object of the present invention to provide an electronic apparatus such as a time-lapse video tape recorder of which the microcomputer is not reset easily by an error such that a mode of operation, once locked, does not become unlocked inadvertently.

Stated briefly, the above and other objects of the present invention are achieved by providing a reset circuit which includes an input terminal where signals at different voltage levels can be applied and makes use of this input terminal both for transmitting data to the microcomputer therethrough and for resetting the microcomputer, depending on the voltage level applied at the input terminal, whereby a dedicated reset switch can be dispensed with.

More in detail, an apparatus such as a video tape recorder embodying the present invention is characterized as having a microcomputer, a back-up power source which, when the supply of power to the microcomputer from an external power source is interrupted, serves as a back-up to apply a back-up voltage to the microcomputer, an input terminal at which voltage levels, individually corresponding to different data related to a mode of operating the apparatus and to be transmitted to the microcomputer, may be applied, and a decoder unit which serves to decode the voltage levels applied to the input terminal and to transmit data corresponding thereto to the microcomputer. When the voltage level inputted to this decoder unit is of a predefined value such as the ground level, a low-level reset signal is transmitted to a reset terminal of the microcomputer, thereby causing the microcomputer to be reset.

BRIEF DESCRIPTION OF DRAWINGS

The accompanying Figure, which is incorporated in and forms a part of the specification, shows a circuit diagram of a principal portion of a reset circuit embodying the present invention as applied to a video tape recorder and, together with the description, serves to explain the principles of the invention.

DETAILED DESCRIPTION OF THE INVENTION

In what follows, the present invention will be explained by way of an example wherein it is applied to a time-lapse video tape recorder. In the Figure, which is a circuit diagram of a principal portion of a reset circuit for a microcomputer 1, numeral 6 indicates a back-up power source, numeral 8 indicates a decoder unit which includes a remote control decoder 2 and a 12-to-4 encoder 3, and numeral 4 indicates a connector terminal (input terminal). These constituent elements are all components of an apparatus such as a video tape recorder (VTR) and are contained within or on its main body as schematically represented by a broken line 20. Numeral 5 indicates a remote controller of a type with two lines and is attached to the main body 20 of the apparatus through the connector terminal 4.

The microcomputer 1 is a so-called timer microcomputer which not only has the function of generating date and time and storing data on modes of operation of the apparatus such as the starting time for recording but also is capable of outputting signals relating to modes of operation of the apparatus 20 to a system control microcomputer (not shown) or the like by receiving signals indicating key-inputted commands of apparatus operation such as "record", "play", "pause", "fast forward" and "rewind".

The back-up power source 6 includes a diode $D_1$, a resistor R and a capacitor C connected as shown in the Figure. When the supply of power to the microcomputer 1 from an external source (+B) through a rectifier diode $D_r$ is cut off, the back-up power source 6 serves to back it up so as to prevent the erasing of data stored in the microcomputer 1. The connector terminal 4 has a GND piece 9 which is grounded and a high-level piece 10 which is connected to the remote control decoder 2 through a signal line 7 being normally maintained at a higher voltage (+B).

According to a particular embodiment of the present invention, the connector terminal 4 on the side of the apparatus 20 is formed as a socket having the GND piece 9 and the high-level piece 10 thereon, and the remote controller 5 is provided with a matching plug 51 at the end of its voltage-outputting lines. The remote controller 5 is comprised of resistors R1, ... R12 and switches SW1, ... SW12 arranged as shown generally in the Figure such that if the remote controller 5 is attached to the apparatus 20 (with the plug 51 engagingly inserted into the socket shown at 4) and any one of these switches is operated, a distinguishable voltage difference corresponding to the operated switch is caused to appear at the connector terminal 4.

The voltage difference thus generated at the connector terminal 4 is received by the remote control decoder 2 which measures it and identifies it by means of comparators (not shown) and outputs one of a preselected set of signals Q1, ... Q12, depending on the measured voltage difference. The 2-to-4 encoder 3 serves to convert signals ($Q_1$, ... $Q_{12}$) outputted from the remote control decoder 2 into 4-bit data and to transmit them to the microcomputer 1. If the voltage difference received by the remote control decoder 2 is zero, a low-level reset signal $Q_0$ is transmitted to a reset terminal of the microcomputer The remote control decoder 2 outputs signals through open collectors and is provided with an independent external power source.

Next, the operation of the circuit shown in the Figure is explained. Under normal circumstances, the remote controller 5 is operated to supply the microcomputer 1 with information for setting a mode of operation of the apparatus 20. If there is a power failure and the voltage of the external source (+B) supplied to the microcomputer 1 drops significantly, the back-up power source 6 begins to function and takes its place. If an external voltage is applied again after its supply has been stopped for a long time and the voltage of the back-up power source drops significantly in the meantime, the microcomputer 1 is reset within a predetermined length of time by means of the capacitor C and the resistor R. According to an embodiment of the present invention, however, the capacity of the back-up source 6 is sufficiently large such that its voltage will drop only to an insignificant degree even if the external power source (+B) is cut off for nearly an hour or so. Thus, the microcomputer 1 is not reset even if the external voltage is applied again in such a situation.

When there is a runaway situation of the microcomputer 1 for whatever reason, it is necessary to reset the microcomputer 1. In such a situation, the GND piece 9 and the high-level piece 10 of the connector terminal 4 may be short-circuited, causing the voltage difference inputted to the remote control decoder 2 to drop to zero such that a low-level reset signal $Q_0$ is outputted therefrom and the microcomputer 1 is reset. The short-circuiting of the GND piece 9 and the high-level piece 10 can be accomplished easily, for example, by using a screw driver or the like. With the connecter terminal 4 formed as a socket as described above, the user can reset the microcomputer 1 simply by pulling the plug 51 off the socket and short-circuiting the GND piece 9 with the high-level piece 10.

It is to be emphasized that the decoder unit 8 is adapted to function independently of the microcomputer so as to be able to correctly identify the inputted voltage levels (voltage differences) and output a $Q_0$ signal even in the case of a runaway of the microcomputer 1. More importantly, the apparatus 20 is not required to be provided with a dedicated reset switch such that an unauthorized user not acquainted with the aforementioned method of resetting will find it difficult to reset the microcomputer inadvertently.

The diode D1 associated with the back-up power source 6 serves to accelerate the discharge of the capacitor C. Since the microcomputer 1 is to be reset only when the low-level signal $Q_0$ is received at the reset terminal, the resistor R and the capacitor C serve to delay the rise in voltage at the reset terminal when power is switched on for the microcomputer 1. When power is switched on and off, for example, due to a faulty contact (the so-called chattering), the voltage at the reset terminal may rise to a high level prematurely, making it impossible to reset the microcomputer 1. The diode $D_1$ connected in parallel with the resistor R has the desired effect of accelerating the discharge of the capacitor C in such a situation. According to the embodiment shown in the Figure, the microcomputer 1 is not reset at the time of power-on if the back-up power source 6 is in a charged condition. The use of a diode for the aforementioned purpose is a known technology.

The foregoing description of a preferred embodiment of the invention has been presented for purposes of illustration and description. It is not intended to be exhaustive or to limit the invention to the precise form disclosed, and many modifications and variations are possible in light of the above teaching. For example, although the present invention has been described above as applied to a time-lapse video tape recorder, this is not intended to limit the scope of the present invention. It now goes without saying that a resetting circuit embodying the present invention can be applied to any microcomputer which is made a part of an electronic apparatus of a different type. Moreover, the decoder unit 8 may be designed so as to output a reset signal $Q_0$ in response to an input of a prespecified voltage difference other than zero.

In summary, since no dedicated reset switch is required according to the present invention, the number of constituent elements becomes reduced and since an unauthorized user is prevented from inadvertently resetting the microcomputer, the present invention can be applied conveniently, for example, to a time-lapse type video tape recorder such that a locked operation mode is not easily released by a third party and the owner can be sure, for example, to have desired programs recorded. Any amendments and variations that may be apparent to a person skilled in the art are intended to be included within the scope of this invention.

What is claimed is:

1. A reset circuit for a microcomputer, said reset circuit comprising
   an input terminal at which different voltage levels are applied corresponding to data to be transmitted to said microcomputer, and
   a decoder which serves to decode said different voltage levels at said input terminal and to transmit data corresponding to said decoded voltage levels to said microcomputer, said decoder further serving to transmit a reset signal to said microcomputer to thereby reset said microcomputer if the ground level voltage is applied at said input terminal and decoded by said decoder.

2. The reset circuit of claim 1 wherein said input terminal includes a socket having a grounded piece and a high-level piece normally maintained at a higher voltage.

3. The reset circuit of claim 1 wherein said microcomputer serves to select a mode of operation of a video tape recorder of which said microcomputer is a part.

4. The reset circuit of claim 1 further comprising a back-up power source which serves to supply a back-up voltage to said microcomputer when the power supply to said microcomputer from an external normal power source is discontinued.

5. The reset circuit of claim 4 wherein said back-up power source is of a sufficiently large capacity such that a supply of said back-up voltage to said microcomputer can be continued for nearly 100 hours.

6. A video tape recorder comprising
a microcomputer having an external power source which normally supplies power thereto and serving to select a mode of operation of said video tape recorder,
an input terminal at which different voltage levels are applied corresponding to command signals to be transmitted to said microcomputer,
a decoder which serves to decode said different voltage levels at said input terminal and to transmit signals to said microcomputer according to said decoded voltage levels, said decoder further serving to transmit a reset signal to said microcomputer to thereby reset said microcomputer if a preselected voltage level is applied at said input terminal, and
a remote controller means for selectably outputting one of a specified set of different voltages for transmitting correspondingly different data to said microcomputer,
said input terminal including a socket, said remote controller means including a plug which can be engagingly attached to said socket such that said different voltages selectably outputted from said remote controller means can be communicated to said decoder, said socket including a grounded piece and a high-level piece which is normally maintained at a higher voltage, and said decoder being caused to transmit said reset signal if said grounded piece and said high-level piece are short-circuited.

7. The video tape recorder of claim 6 further comprising a back-up power source which serves to supply a back-up voltage to said microcomputer when the power supply to said microcomputer from said external power source is discontinued.

8. The video tape recorder of claim 6 further comprising a main body which contains said microcomputer and said decoder therein, said input terminal being provided on said main body.

9. The video tape recorder of claim 6 wherein said different command signals relate to different modes of operating said video tape recorder.

10. The video tape recorder of claim 6 wherein said reset signal is a low-voltage signal.

11. The video tape recorder of claim 6 wherein said command signals to be transmitted to said microcomputer include commands to record, play, pause, fast forward and rewind.

* * * * *